United States Patent
Lim et al.

(10) Patent No.: US 7,987,425 B2
(45) Date of Patent: Jul. 26, 2011

(54) METHODS AND SYSTEMS FOR HANDLING HIDDEN DIALOGS IN A MEDIA CENTERED GRAPHICAL USER ENVIRONMENT

(75) Inventors: Ruth Ann Lim, Santa Clara, CA (US); Chandar Kumar Oddiraju, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1383 days.

(21) Appl. No.: 11/238,766

(22) Filed: Sep. 28, 2005

(65) Prior Publication Data

US 2007/0074128 A1    Mar. 29, 2007

(51) Int. Cl.
*G06F 3/00* (2006.01)
*G06F 3/048* (2006.01)
(52) U.S. Cl. .................... 715/741; 715/810; 715/764
(58) Field of Classification Search .................. 715/741
See application file for complete search history.

(56) References Cited

OTHER PUBLICATIONS

Zone Labs, User Guide for Zone Labs Security Software, version 4.5, Nov. 18, 2003 (first version)—Apr. 12, 2004 (last version), Chapter 1 installation, Chapter 2 Basics, Chapter 4 Firewall Protection.*

\* cited by examiner

*Primary Examiner* — Simon Ke
*Assistant Examiner* — Erik V Stitt

(57) ABSTRACT

An exemplary method for handling a hidden dialog in a media centered graphical user environment is presented including: detecting the hidden dialog; determining whether the hidden dialog is an approved dialog; if the hidden dialog is an approved dialog, providing a notification to a user of the hidden dialog such that the media centered graphical user environment is interrupted; and if the hidden dialog is not an approved dialog, ignoring the hidden dialog such that the media centered graphical user environment is uninterrupted. In some embodiments, the hidden dialog originates from any WINDOWS™ compatible program. In some embodiments, the hidden dialog is a pop-up notification. In some embodiments, the approved dialog is user configurable. In some embodiments, the approved dialog may be: a programmatic subscription dialog, a programmatic update dialog, a programmatic alert dialog, and a system alert dialog.

20 Claims, 3 Drawing Sheets

METHODS AND SYSTEMS FOR HANDLING HIDDEN DIALOGS IN A MEDIA CENTERED GRAPHICAL USER ENVIRONMENT

CROSS REFERENCE TO RELATED APPLICATIONS

The present invention is related to the following applications, all of which are incorporated herein by reference:

Commonly assigned application entitled "GRAPHICAL USER INTERFACE FOR MANAGING NATIVE DISPLAY RESOLUTION FROM A DISTANCE," filed Sep. 28, 2005 by the same inventors herein and assigned Ser. No. 11/240,442.

BACKGROUND

Media display systems have become increasingly sophisticated as technology advances have made more media streams available to users. From over the air broadcasts to Internet streaming video, media display systems are now enabled to manage and process a variety of complex media streams. Indeed, in some prior art solutions, a dedicated media centered graphical user environment managed by a computing system may be utilized to display various types of media streams. A dedicated media centered graphical user environment is an environment that provides a graphical user interface dedicated to managing media streams thus greatly simplifying user interaction while viewing media content. As a practical matter, however, simplifying user interaction (by limiting computer functionality) in a dedicated media centered graphical user environment can pose undesired limitations.

For example, FIG. 1 is an illustrative flowchart of a prior art method of receiving a hidden dialog. In a standard computing system, dialogs may be utilized to inform a user of various programmatic and system conditions. For example, a virus program subscription notification may be displayed to remind a user to update a subscription. In media centered graphical user environments, however, a user may be shielded from dialogs as a result of inherent limited functionality of the environment. As such, dialogs may remain hidden from a user unless specific action is taken to view those hidden dialogs. Thus at a first step 104, in prior art systems, a hidden dialog is received. As noted above, a hidden dialog is a dialog that, in a media centered graphical user environment is not displayed to a user as in at a step 106. The method then determines whether the computing system is shutdown or logged off at a step 108. If the computing system is shutdown or logged off at a step 108, the user misses the hidden dialog at a step 116. That is, where a media centered graphical user environment is being utilized, the computing system may simply shutdown or log off directly from the environment thus never revealing the hidden dialog. The method then ends.

If the computing system is not shutdown or logged off at a step 108, a user may minimize or exit the media centered graphical user environment at a step 110. At this point, outside of the media centered graphical user environment, the hidden dialog may be seen at a step 112. A user may then choose to ignore, or react to the hidden dialog in accordance with user preferences. At a next step 114, the user may return to the media centered graphical user environment to continue viewing media. The method then ends.

As can be appreciated, hidden dialogs may contain system critical information for a user. Thus, it may be advantageous to mitigate occurrences of hidden dialogs in media centered graphical user environments so that a user may address computing system issues without unduly interfering with a user's viewing experience. Therefore, methods and systems for handling hidden dialogs in a media centered graphical user environment are presented herein.

SUMMARY

The invention provides methods and systems for handling hidden dialogs in a media centered graphical user environment that may be utilized in a variety of computing systems thereby enhancing user operability.

An exemplary method for handling a hidden dialog in a media centered graphical user environment is presented including: detecting the hidden dialog; determining whether the hidden dialog is an approved dialog; if the hidden dialog is an approved dialog, providing a notification to a user of the hidden dialog such that the media centered graphical user environment is interrupted; and if the hidden dialog is not an approved dialog, ignoring the hidden dialog such that the media centered graphical user environment is uninterrupted. In some embodiments, the hidden dialog originates from any WINDOWS™ compatible program. In some embodiments, the hidden dialog is a pop-up notification. In some embodiments, the approved dialog is user configurable. In some embodiments, the approved dialog may be: a programmatic subscription dialog, a programmatic update dialog, a programmatic alert dialog, and a system alert dialog. In some embodiments, the notification may be a visual alert, an audio alert, and an audio visual alert

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
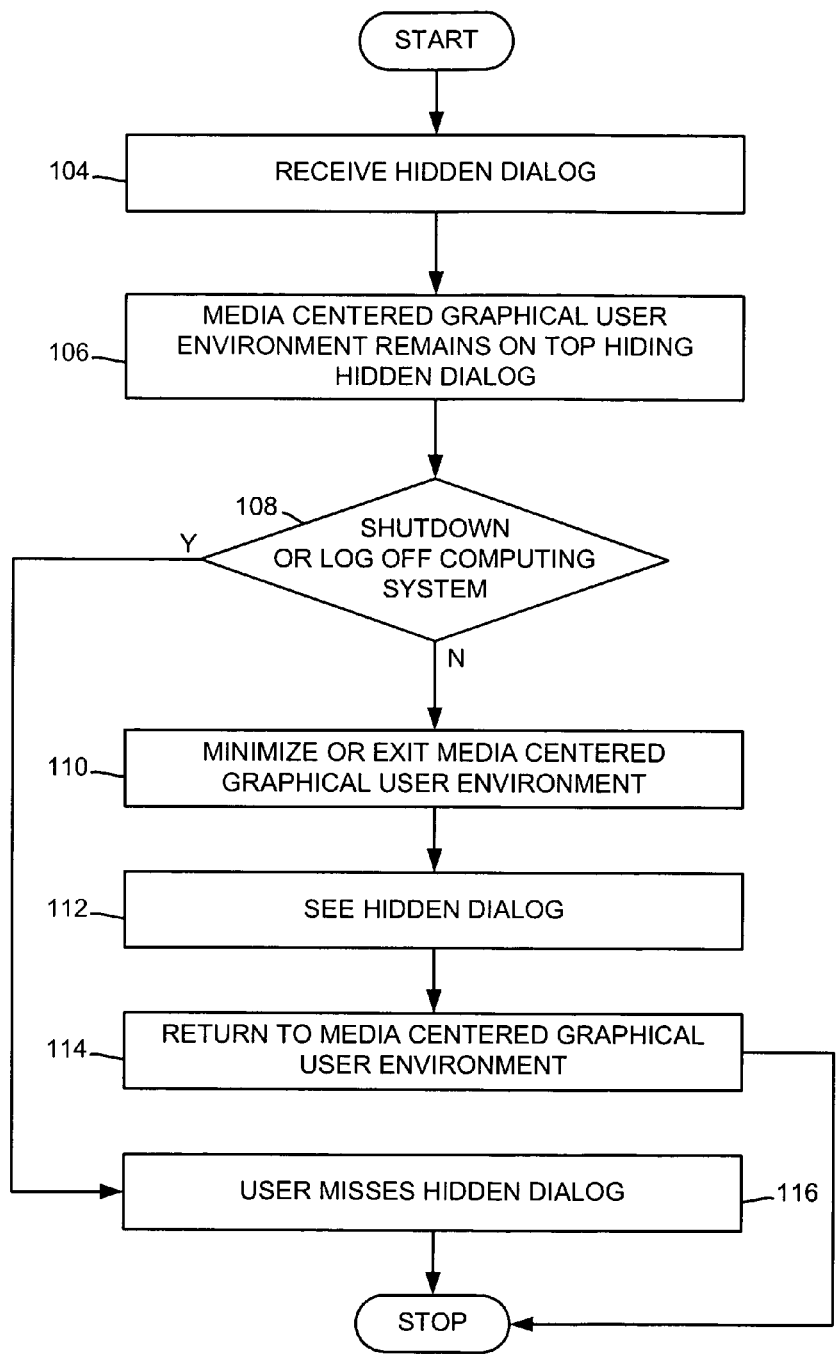
FIG. 1 is an illustrative flowchart of a prior art method of receiving a hidden dialog.
Figure 2:
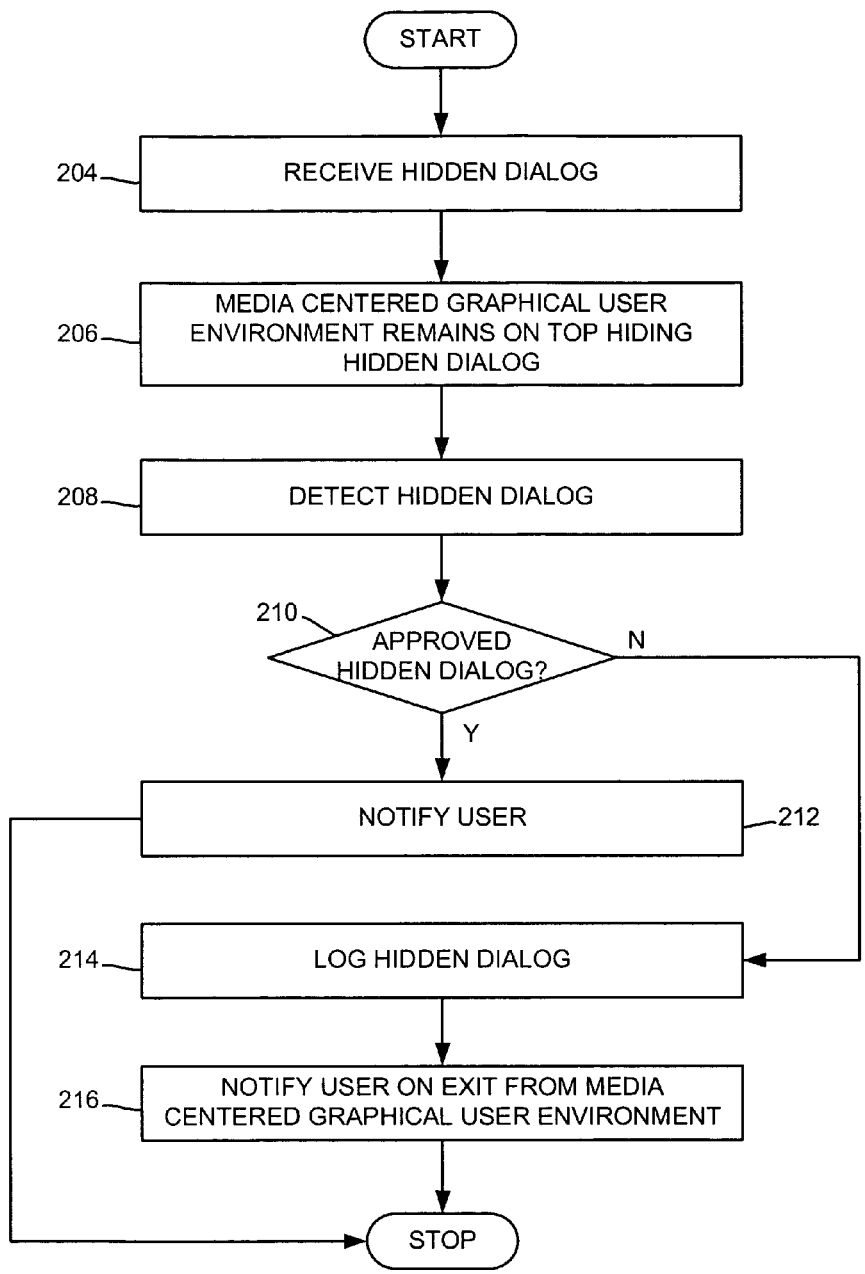
FIG. 2 is an illustrative representation of a method of handling a hidden dialog in accordance with embodiments of the present invention.

FIG. 2 is an illustrative representation of a method of handling a hidden dialog in accordance with embodiments of the present invention. In particular, the method illustrated allows for handling of a hidden dialog in a media centered graphical user environment. In some embodiments, the media centered graphical user environment is a WINDOWS™ Media Center environment. At a first step 204, a hidden dialog is received. As noted above, in prior art solutions, dialogs received in a media centered graphical user environment may be hidden from a user in order to simplify and enhance a user's viewing experience. Thus, at a step 206, the hidden dialog is not visible over a media centered graphical user environment. The method then detects the hidden dialog at a step 208. Detecting a hidden dialog may be accomplished by any manner well-known in the art. In some embodiments, a hidden dialog may be a pop-up notification as is commonly utilized in Internet browser applications.

The method then determines whether the hidden dialog is an approved dialog at a step 210. An approved dialog is a dialog that has been configured by a user so that the method informs the user of its presence. Thus, for example, a user may configure a virus subscription notification dialog as an approved dialog. In this example, a virus subscription notification dialog may be detected at a step 210 while in the media centered graphical user environment. As may be appreciated, approved dialogs may include any number of dialogs such as, a programmatic subscription dialog, a programmatic update dialog, a programmatic alert dialog, and a system alert dialog. Furthermore, dialogs may, in some embodiments, originate from any WINDOWS™ compatible program.

If the method determines that a hidden dialog is an approved dialog at a step 210, the method continues to notify the user of the hidden dialog at a step 212. Notification may be accomplished in any number of manners including by a visual alert (graphic), an audio alert (sound), or an audio visual alert (sound and graphic). In some embodiments, a visual alert may also include a text message. In other embodiments, notification may be configured to completely interrupt a media centered graphical user environment (i.e. to exit or minimize the media centered graphical user environment) or to partially interrupt a media centered graphical user environment (i.e. display a graphic or play a sound over the media centered graphical user environment).

If the method determines that a hidden dialog is not an approved dialog at a step 210, the method continues to log the hidden dialog at a step 214. As can be appreciated, some dialogs that may be displayed are not critical to system maintenance or security. In those instances, a user may desire to be insulated from continual interruption. However, a user may yet desire to track all received dialogs to be addressed in turn at a later, more convenient time. Thus, at a step 214, unapproved hidden dialog may be logged such that the unapproved hidden dialogs are at least immediately ignored by a user. At a next step 216, the method may provide notification to a user that unapproved hidden dialogs have been logged when the user exits the media centered graphical user environment. As can be appreciated, exiting the media centered graphical user environment may include minimizing the media centered graphical user environment, closing the media centered graphical user environment, logging off of the computing system, or shutting down the computing system. In this manner, a user may be assured of properly tracking received dialogs after leaving a media centered graphical user environment.

As can be appreciated, the method described above takes place within a media centered graphical user environment. Thus, a user may fully enjoy the simplified functionality of a media centered graphical user environment without sacrificing notification of important dialogs relating to computing system operations.

Figure 3:
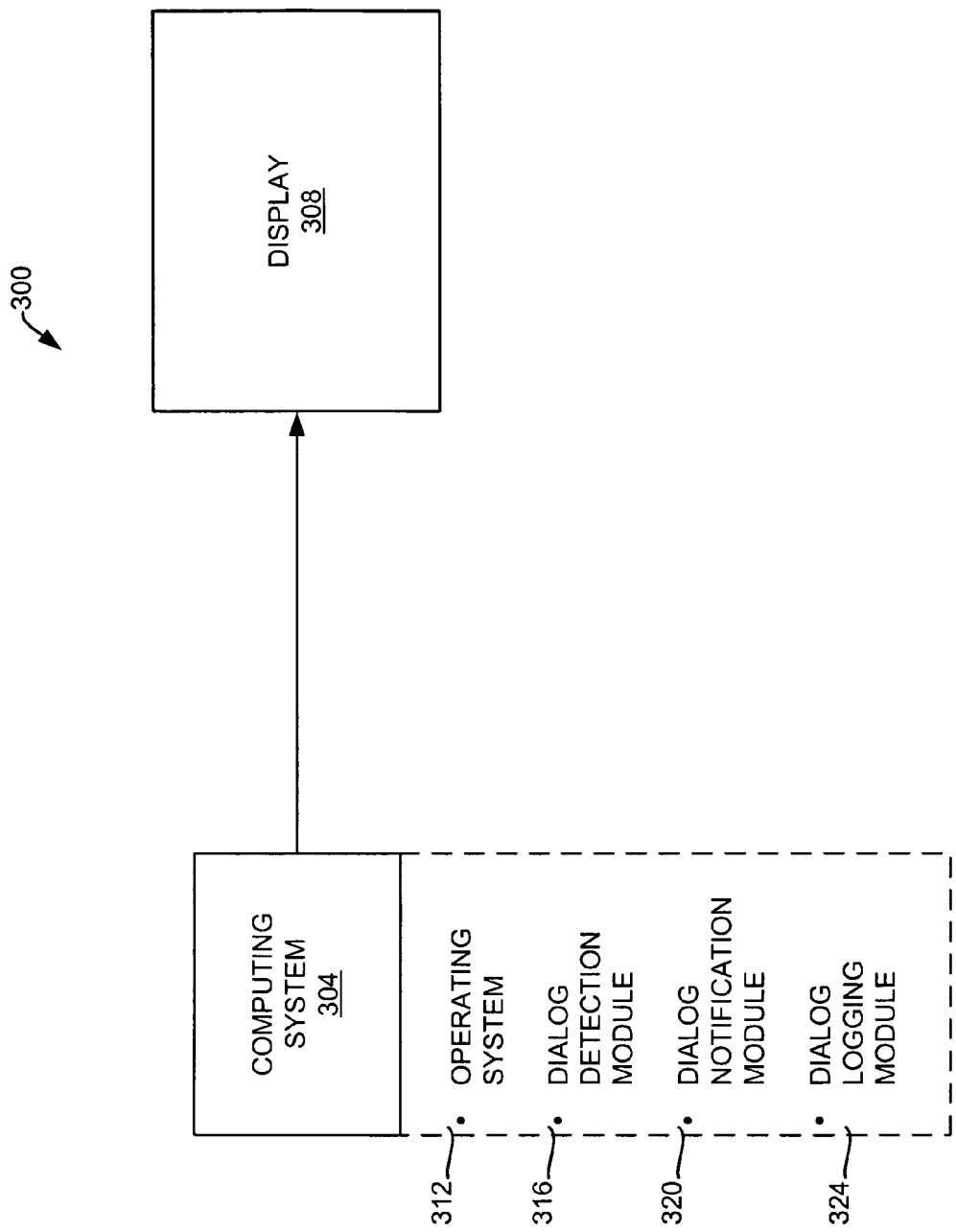
FIG. 3 is an illustrative diagram of a system for managing a hidden dialog in accordance with embodiments of the present invention.

FIG. 3 is an illustrative diagram of a system 300 for managing a hidden dialog in accordance with embodiments of the present invention. As illustrated, system 300 includes a computing system 304 electronically coupled with a display 308 for displaying media. As can be appreciated, computing system 304 may be utilized to control any number of media streams including, for example, computer system media, digital media, analog media, cable media, satellite media, Internet media, and broadcast media. As noted above many different types of media streams may be available in modern systems. Thus, the use of a computing system to manage media streams may offer distinct advantages over component systems. Computing system 304 may include an operating system 312. As can be appreciated, an operating system may be configured to utilize a media centered graphical user environment. That is, when the operating system is booted, it may be configured to immediately invoke a media centered graphical user environment for a user. In some embodiments, the operating system may be configured as a WINDOWS™ XP operating system. In other embodiments, the media centered graphical user environment is a WINDOWS™ Media Center environment.

Computing system 304 further includes a dialog detection module 316 for detecting hidden dialogs. As noted above, hidden dialogs are dialogs that are hidden in some embodiments utilizing a media centered graphical user environment. Hidden dialogs may be invoked in response to an operating system operation which may, in turn, be responsive to a programmatic command. The dialog detection module 316 may be configured with a user configurable approved dialog list or table. As noted above, a user may configure a dialog such that methods described herein may notify a user of receiving the configured dialog. Thus, dialog detection module 316 may further include a configuration component for populating the user configurable approved dialog list or table with approved dialogs. In this manner, approved dialogs may be added or deleted from the user configurable approved dialog list or table in accordance with user preferences. Finally, dialog detection module 316 may further include a comparison component for comparing a received hidden dialog against the user configurable approved dialog list. Comparing as described herein is well-known in the art and may be accomplished in any suitable manner.

Computing system 304 further includes a dialog notification module 320 for interrupting the media centered graphical user environment such that a notification is made to the user when a hidden dialog is an approved dialog. As noted above, notification may be accomplished in any number of manners including by a visual alert (graphic), an audio alert (sound), or an audio visual alert (sound and graphic). In some embodiments, a visual alert may also include a text message. In other embodiments, notification may be configured to completely interrupt a media centered graphical user environment (i.e. to exit or minimize the media centered graphical user environment) or to partially interrupt a media centered graphical user environment (i.e. display a graphic or play a sound).

Finally, computing system 304 further includes a dialog logging module 324 for logging a hidden dialog if the hidden dialog is not an approved dialog. In some embodiments, dialog logging module 324 may be further configured to notify a user of logged hidden dialogs on exit from a media centered graphical user environment. As noted above, notification may be accomplished in any number of manners including by a visual alert (graphic), an audio alert (sound), or an audio visual alert (sound and graphic). In some embodiments, a visual alert may also include a text message.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for handling a hidden dialog in a media centered graphical user environment comprising:
   detecting, by a computing system, the hidden dialog;
   determining, by the computing system, whether the hidden dialog is an approved dialog;
   if the hidden dialog is an approved dialog,
      providing, by the computing system, a first notification to a user of the hidden dialog such that the media centered graphical user environment is interrupted, and automatically minimizing or exiting, by the computing system, the media centered graphical user environment so that the user can view the hidden dialogue; and
   if the hidden dialog is not an approved dialog,
      ignoring, by the computing system, the hidden dialog such that the media centered graphical user environment is uninterrupted.

2. The method of claim 1 wherein the hidden dialog originates from an operating system.

3. The method of claim 2 wherein the hidden dialog is a pop-up notification.

4. The method of claim 1 wherein the approved dialog is user configurable.

5. The method of claim 4 wherein the approved dialog is selected from the group consisting of: a programmatic subscription dialog, a programmatic update dialog, a programmatic alert dialog, and a system alert dialog.

6. The method of claim 1 wherein the notification is selected from the group consisting of: a visual alert, an audio alert, and an audio visual alert.

7. The method of claim 1 wherein the ignoring the hidden dialog comprises:
   logging a hidden dialog event; and
   providing a second notification to the user when the user exits the media centered graphical user environment.

8. A method for handling a hidden dialog in a media centered graphical user environment comprising:
   detecting, by the computing system, the hidden dialog;
   determining, by the computing system, whether the hidden dialog is an approved dialog; if the hidden dialog is an approved dialog,
      providing, by the computing system, a first notification to a user of the hidden dialog such that the media centered graphical user environment is interrupted, and automatically minimizing or exiting, by the computing system, the media centered graphical user environment to permit the user to view the hidden dialogue; and if the hidden dialog is not an approved dialog,
      ignoring, by the computing system, the hidden dialog such that the media centered graphical user environment is uninterrupted.

9. The method of claim 8 wherein the hidden dialog originates from any operating system.

10. The method of claim 9 wherein the hidden dialog is a pop-up notification.

11. The method of claim 8 wherein the approved dialog is user configurable.

12. The method of claim 11 wherein the approved dialog is selected from the group consisting of: a programmatic subscription dialog, a programmatic update dialog, a programmatic alert dialog, and a system alert dialog.

13. The method of claim 8 wherein the notification is selected from the group consisting of: a visual alert, an audio alert, and an audio visual alert.

14. The method of claim 8 wherein the ignoring the hidden dialog comprises:
   logging a hidden dialog event; and
   providing a second notification to the user when the user exits the media centered graphical user environment.

15. A system for handling a hidden dialog in a media centered graphical user environment comprising: a computing system; an operating system executed by the computing system while the media centered graphical user environment is open, the computing system being electronically coupled with a display for displaying media;
   a dialog detection module for detecting a hidden dialog that can only be viewed on the display when the media centered graphical user environment has been minimized or exited, the hidden dialog invoked by the operating system while the media centered graphical user environment is open;
   a dialog notification module for interrupting the media centered graphical user environment such that a notification is made to the user when the hidden dialog is an approved dialog; and
   a dialog logging module for logging the hidden dialog if the hidden dialog is not an approved dialog.

16. The system of claim 15 wherein the media is selected from the group consisting of: computer system media, digital media, analog media, cable media, satellite media, Internet media, and broadcast media.

17. The system of claim 15 wherein the dialog detection module comprises: a user configurable approved dialog list; a configuration component for populating the user configurable approved dialog list with the approved dialog; and a comparison component for comparing a received hidden dialog with the user configurable approved dialog list.

18. The system of claim 15 wherein the notification is selected from the group consisting of: a visual alert, an audio alert, and an audio visual alert.

19. The system of claim 15 wherein the approved dialog is selected from the group consisting of: a programmatic subscription dialog, a programmatic update dialog, a programmatic alert dialog, and a system alert dialog.

20. The system of claim 15 wherein the dialog logging module is further configured for providing a second notification to the user when the user exits the media centered graphical user environment.

* * * * *